(12) United States Patent
Ruan

(10) Patent No.: US 11,903,782 B1
(45) Date of Patent: Feb. 20, 2024

(54) ELECTRIC TOOTHBRUSH CONNECTING MEMBER AND ELECTRIC TOOTHBRUSH

(71) Applicant: Xiaoli Ruan, Gaozhou (CN)

(72) Inventor: Xiaoli Ruan, Gaozhou (CN)

( * ) Notice: Subject to any disclaimer, the term of this patent is extended or adjusted under 35 U.S.C. 154(b) by 0 days.

(21) Appl. No.: 18/333,871

(22) Filed: Jun. 13, 2023

(51) Int. Cl.
*A46B 13/02* (2006.01)
*A61C 17/22* (2006.01)
*A46B 5/00* (2006.01)
*A46B 9/04* (2006.01)

(52) U.S. Cl.
CPC .......... *A61C 17/222* (2013.01); *A46B 5/0095* (2013.01); *A46B 9/04* (2013.01); *A46B 13/023* (2013.01)

(58) Field of Classification Search
CPC ............ A46B 13/02; A46B 9/04; A61C 17/34
See application file for complete search history.

(56) References Cited

U.S. PATENT DOCUMENTS

| 6,385,808 | B1 | 5/2002 | Yamada et al. | |
| 11,311,096 | B2* | 4/2022 | Wagner | A61C 17/222 |
| 2010/0101032 | A1 | 4/2010 | Kressner | |
| 2021/0100346 | A1* | 4/2021 | Dishon | A61C 17/222 |
| 2021/0153990 | A1 | 5/2021 | Cavagnaro | |
| 2021/0289930 | A1* | 9/2021 | Wagner | A61C 17/222 |
| 2023/0140465 | A1* | 5/2023 | Johnson | A61C 17/222 15/22.2 |

* cited by examiner

*Primary Examiner* — Michael D Jennings

(57) ABSTRACT

The present invention discloses an electric toothbrush connecting member and an electric toothbrush. The electric toothbrush connecting member includes a connecting member body and an elastic member. The connecting member body includes an anti-release fastening position. The outer wall of the connecting member body surrounds a recess and is provided with a mounting groove adapted to the elastic member. The elastic member is sleeved on the mounting groove. The anti-release fastening position protrudes and is arranged on the surface of one side of the mounting groove. In the present invention, the outer wall of the connecting member body is sleeved with the elastic member thereon. The anti-release fastening position is arranged to fix the elastic member in place. The elastic member is additionally arranged. Therefore, the connecting member body can flexibly adjust the tightness of a handle, effectively transferring the mechanical vibration energy of a drive handle to the head of the toothbrush and reducing noise. The elastic member can also reduce the wear of the connecting member body and the handle due to the high-frequency vibration of the electric toothbrush for a long time, which is more conducive to improving the service life and cleaning effect of the electric toothbrush.

11 Claims, 6 Drawing Sheets

ELECTRIC TOOTHBRUSH CONNECTING MEMBER AND ELECTRIC TOOTHBRUSH

TECHNICAL FIELD

The present invention relates to the technical field of an electric toothbrush, and in particular, to an electric toothbrush connecting member and an electric toothbrush.

TECHNICAL BACKGROUND

An automatic cleaning care device is becoming more widely used in everyday life. An electric toothbrush can clean teeth more easily and effectively. The electric toothbrush usually uses high-speed vibration to clean teeth, with different vibration patterns and strength. Currently, main vibration methods of the electric toothbrush on the market are rotary vibration, sonic vibration, ultrasonic vibration, etc.

Most of the electric toothbrushes can be divided into a replaceable toothbrush head and a drive handle. Most of the electric toothbrushes in the prior art achieve the high frequency vibration of the toothbrush head via mechanical motion on the drive handle that is transferred to the toothbrush head, so as to play an effect of cleaning teeth. When the electric toothbrush is vibrated at a high frequency, there is a bigger noise problem when the mechanical motion on the drive handle is transferred.

SUMMARY

A main objective of the present invention is to provide an electric toothbrush connecting member and an electric toothbrush, which aims to solve the problem that the electric toothbrush in the prior art is noisy in the process of use.

To achieve the forgoing objective, the present invention proposes an electric toothbrush connecting member and an electric toothbrush. The electric toothbrush connecting member includes a connecting member body and an elastic member. The connecting member body includes an anti-release fastening position. The outer wall of the connecting member body surrounds a recess and is provided with a mounting groove adapted to the elastic member. The elastic member is sleeved on the mounting groove. The anti-release fastening position protrudes and is arranged on the surface of one side of the mounting groove.

In one embodiment, a disconnecting groove is provided between the anti-release fastening position and the top of the connecting member body. The outer wall of the top of the connecting member body is recessed, opened and provided with a guide groove. The guide groove extends to the disconnecting groove and is communicated with the disconnecting groove.

In one embodiment, the connecting member body further includes a limit seat. The limit seat is provided at the bottom of the disconnecting groove. The limit seat is partially sleeved on the side of the mounting groove away from the anti-release fastening position. The elastic member is sleeved on the mounting groove. One side of the elastic member rests against both the anti-release fastening position and the limit seat.

In one embodiment, the inner part of the connecting member body passes through and is opened and provided with a mounting cavity. The inner wall of the mounting cavity corresponding to the position of the mounting groove is provided with a tooth-shaped rib position.

In one embodiment, the connecting member body further includes an annular fastening position. The annular fastening position partially surrounds, protrudes and is provided on the outer wall of the bottom of the connecting member body.

In one embodiment, the connecting member body further includes a guide bone position. The guide bone position protrudes and is provided on the surface of one side of the mounting groove in a direction of the tail of the connecting member body. Two sides of the guide bone position are both opened and provided with a U-shaped hole. The U-shaped hole extends in a direction of the mounting cavity and is communicated with the mounting cavity.

In one embodiment, the connecting member body has a diameter progressively increasing from top to bottom.

The present invention further proposes an electric toothbrush, including a toothbrush head and a drive handle. The drive handle includes an electric toothbrush connecting member and a handle as described in the forgoing embodiment. The electric toothbrush connecting member is configured to connect the toothbrush head with the handle. The toothbrush head is sleeved on the electric toothbrush connecting member. The top of the handle passes through and is provided inside a mounting cavity.

In one embodiment, the toothbrush head includes a toothbrush head part and a toothbrush rod. The toothbrush head part is provided at the head of the toothbrush rod. The inner part of the toothbrush rod is provided with a mounting space with an opening at one side of the mounting space. The electric toothbrush connecting member is provided inside the mounting space. The handle partially rests against the opening of the mounting space when the top of the handle partially penetrates inside the mounting cavity.

The present invention has the following beneficial effects:

In the present invention, the outer wall of the connecting member body is sleeved with the elastic member thereon. The anti-release fastening position is arranged to fix the elastic member in place. The elastic member is additionally arranged. Therefore, the connecting member body can flexibly adjust the tightness of a handle, effectively transferring the mechanical vibration energy of a drive handle to the head of the toothbrush and reducing noise. The elastic member can also reduce the wear of the connecting member body and the handle due to the high frequency vibration of the electric toothbrush for a long time, which is more conducive to improving the service life and cleaning effect of the electric toothbrush.

BRIEF DESCRIPTION OF THE DRAWINGS

In order to explain embodiments of the present invention or the technical solutions in the prior art more clearly, the following briefly introduces the drawings that need to be used in the embodiments or the prior art. Obviously, the drawings in the following description are only some of embodiments of the present invention. Those skilled in the art may obtain other drawings based on structures shown in these drawings without creative labor.

Figure 1:
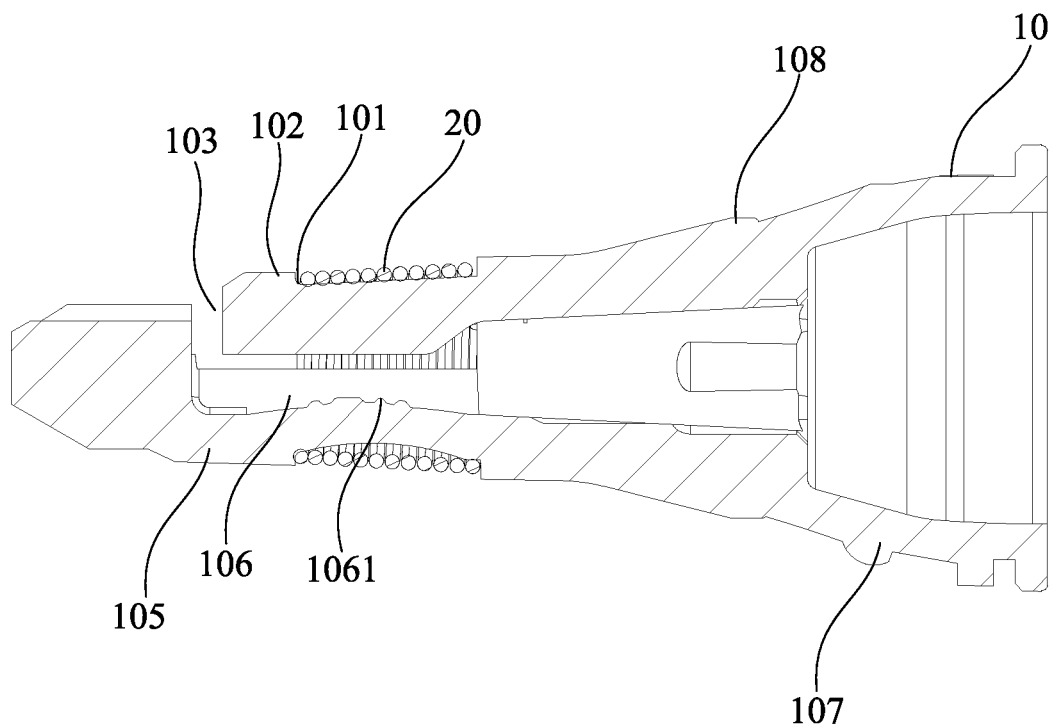
FIG. 1 is a cross-sectional view of an electric toothbrush connecting member of the present invention.

Reference numerals are described as follows:

Connection member body 10; mounting groove 101; anti-release fastening position 102; disconnecting groove 103; guide groove 104; limit seat 105; mounting cavity 106; tooth-shaped rib position 1061; annular fastening position 107; guide bone position 108; U-shaped hole 109; elastic member 20; toothbrush head part 301; toothbrush rod 302; handle 40.

The realization, functional features, and advantages of the present invention will be described further with reference to the accompanying drawings.

DETAILED DESCRIPTION OF EMBODIMENTS

The following clearly and completely describes the technical solutions in embodiments of the present invention in conjunction with the drawings in the embodiments of the present invention. Obviously, the described embodiments are only a part of the embodiments of the present invention, rather than all embodiments. Based on the embodiments of the present invention, all other embodiments obtained by a person skilled in the art without creative labor shall fall within the protection scope of the present invention.

It should be noted that if the embodiments of the present invention involve directional indications (such as up, down, left, right, front, back . . . ), the directional indications are only used to explain a relative position relationship and movement among various components under a certain posture (as shown in the accompanying drawings). If the specific posture changes, the directional indication also changes accordingly.

In addition, if there are descriptions of terms such as "first", "second" and the like in the embodiments of the present invention, the descriptions of the terms such as "first", "second" and the like are merely intended for a purpose of description, and shall not be understood as an indication or implication of relative importance or implicit indication of a quantity of indicated technical features. Therefore, the features defined with "first" and "second" can explicitly or implicitly include at least one of the features. In addition, the meaning of "and/or" in the whole text is to include three parallel schemes. Taking "A and/or B" as an example, "A and/or B" includes scheme A, scheme B, or a scheme that A and B are satisfied at the same time. In addition, the technical solutions between the various embodiments can be combined with each other, but should be based on what can be achieved by those skilled in the art. When a combination of technical solutions is contradictory or cannot be achieved, it should be considered that such a combination of technical solutions does not exist, and also does not fall within the scope of protection required by the present invention.

Figure 2:
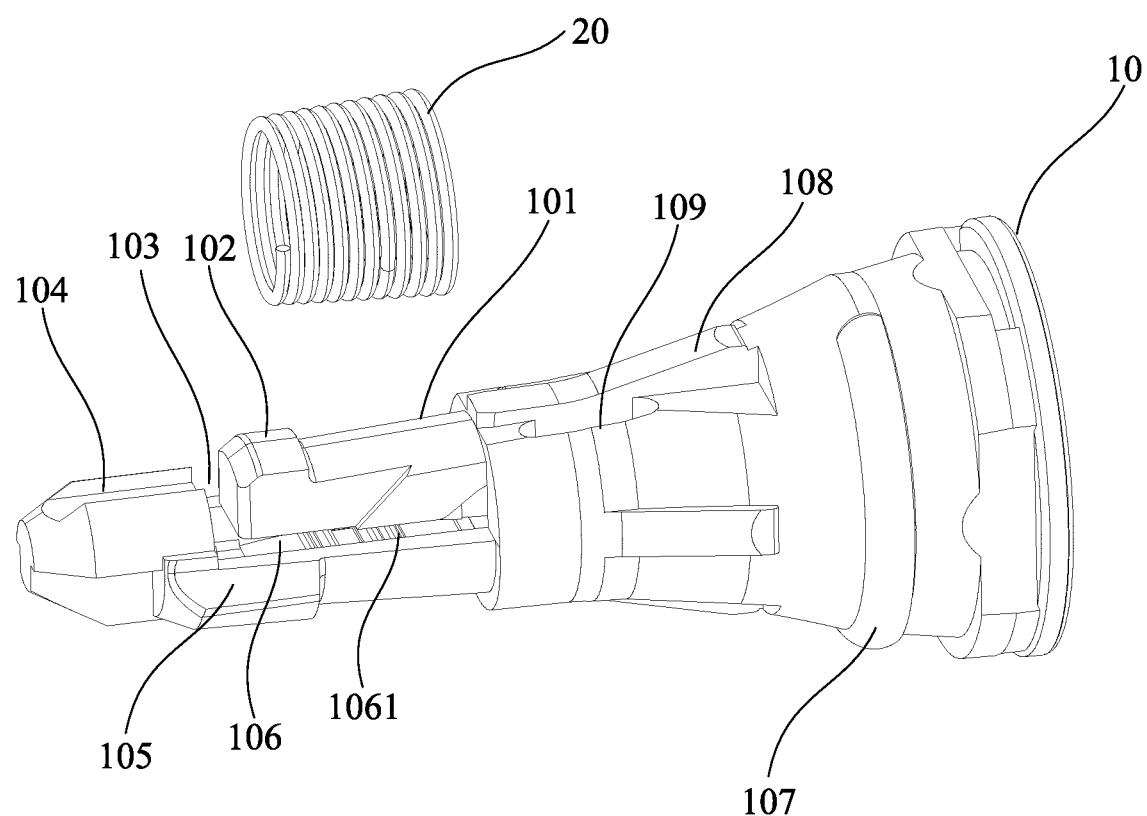
FIG. 2 is an exploded view of an electric toothbrush connecting member of the present invention.

Referring to FIGS. 1 and 2, an embodiment of the present invention proposes an electric toothbrush connecting member and an electric toothbrush. The electric toothbrush connecting member includes a connecting member body 10 and an elastic member 20. The connecting member body 10 includes an anti-release fastening position 102. The outer wall of the connecting member body 10 surrounds a recess and is provided with a mounting groove 101 adapted to the elastic member 20. The elastic member 20 is sleeved on the mounting groove 101. The anti-release fastening position 102 protrudes and is arranged on the surface of one side of the mounting groove 101.

Specifically, in this embodiment, the elastic member 20 is provided as a damping spring structure. The elastic member 20 is sleeved on the mounting groove 101. The elastic member 20 elastically clamps the connecting member body 10, which can effectively reduce the noise generated when the connecting member body 10 transmits vibration, and can prevent the toothbrush head from falling off due to vibration. The anti-release fastening position 102 is provided on one side of the mounting groove 101, which can effectively prevent the elastic member 20 from slipping off from the connecting member body 10. Therefore, the elastic member 20 can better function, which is more conducive to improving the service life and the cleaning effect of the electric toothbrush.

Referring to FIG. 2, a disconnecting groove 103 is provided between the anti-release fastening position 102 and the top of the connecting member body 10. The outer wall of the top of the connecting member body 10 is recessed, opened and provided with a guide groove 104. The guide groove 104 extends to the disconnecting groove 103 and is communicated with the disconnecting groove 103.

Specifically, in this embodiment, the disconnecting groove 103 is opened and provided between the anti-release fastening position 102 and the top of the connecting member body 10, and extends to the inner part of the mounting groove 101 to be communicated with the mounting cavity 106. The part of the mounting groove 101 provided with the anti-release fastening position 102 is pressed in a direction of the mounting cavity 106 to be at the same level with the guide groove 104. In addition, the elastic member 20 has a diameter larger than that of the mounting groove 101, which facilitates the sleeving of the elastic member 20. Therefore, this design facilitates the elastic assembly of the elastic member 20 as well as the easy disassembly and replacement of the elastic member 20.

Figure 3:
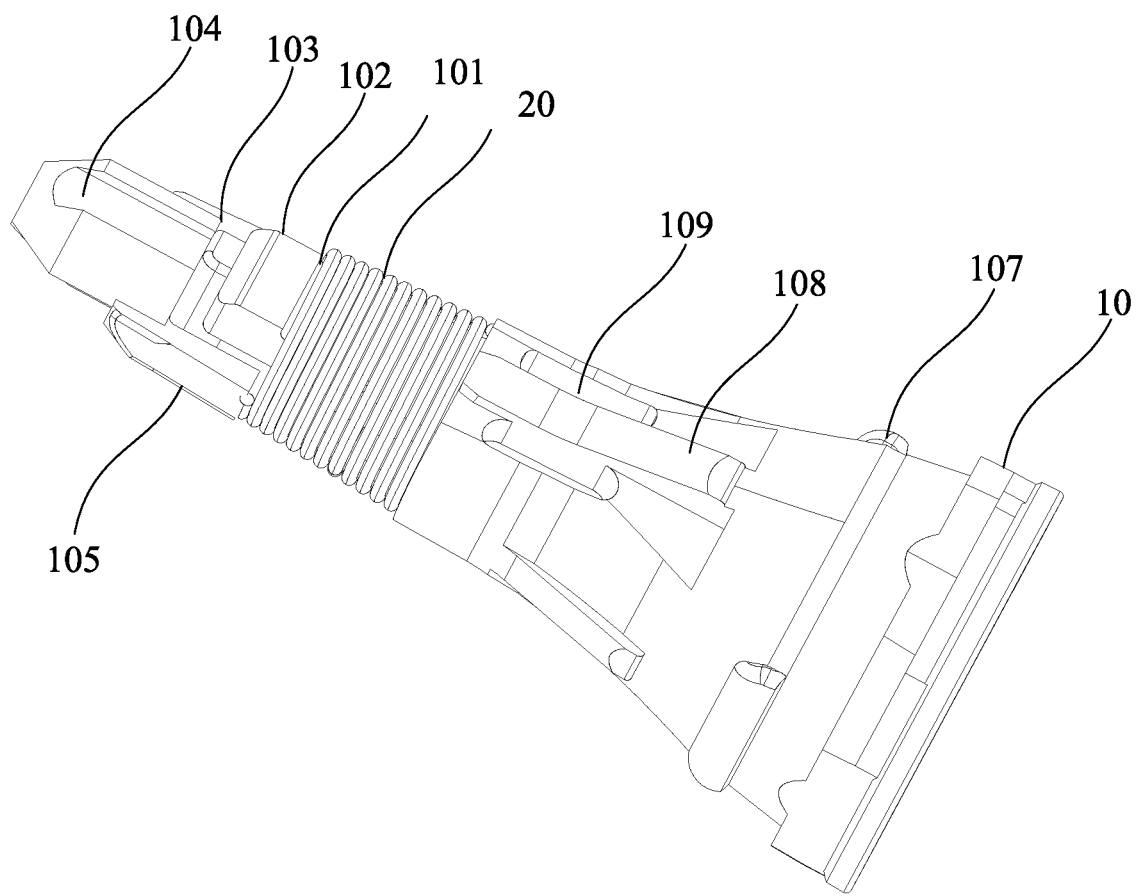
FIG. 3 is a schematic structural diagram of an electric toothbrush connecting member of the present invention.

Referring to FIGS. 2 and 3, the connecting member body 10 further includes a limit seat 105. The limit seat 105 is provided at the bottom of the disconnecting groove 103. The limit seat 105 is partially sleeved on the side of the mounting groove 101 away from the anti-release fastening position 102. The elastic member 20 is sleeved on the mounting groove 101. One side of the elastic member 20 rests against both the anti-release fastening position 102 and the limit seat 105.

Specifically, in this embodiment, the two sides of the limit seat 105 are flat, which can play a positioning role in the process of assembling the electric toothbrush connecting member and the toothbrush head, and can prevent the connecting member body 10 from swinging from left to right. The bottom of the limit seat 105 is fixed to one side of the mounting groove 101. The top of the limit seat 105 is connected to the disconnecting groove 103. Therefore, if the mounting groove 101 needs to be pressed, it is only necessary to press the anti-release fastening position 102 and the limit seat 105 against each other, which is easy to operate.

Figure 4:
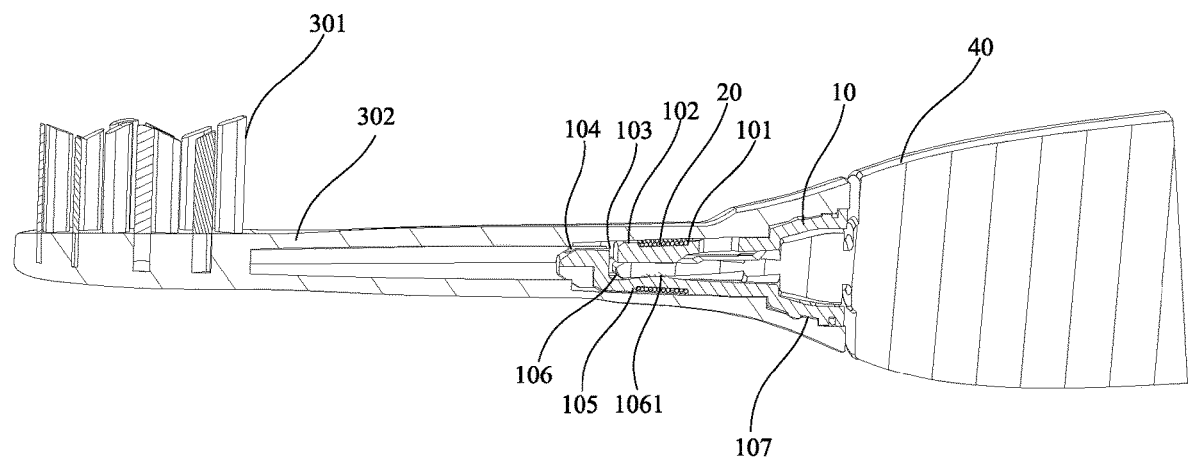
FIG. 4 is a cross-sectional view of an electric toothbrush of the present invention

Referring to FIGS. 2 and 4, the inner part of the connecting member body 10 passes through and is opened and provided with a mounting cavity 106. The inner wall of the mounting cavity 106 corresponding to the position of the mounting groove 101 is provided with a tooth-shaped rib position 1061.

Specifically, in this embodiment, when the top of the handle 40 is built into the mounting cavity 106, the elastic member 20 cooperates with the tooth-shaped rib position 1061 to facilitate the elastic clamping of the handle 40. In addition, the outer wall of the handle 40 is provided with a groove position adapted to the tooth-shaped rib position 1061 and is snap-fitted into each other and connected to the tooth-shaped rib position 1061. Therefore, the connecting member can be better fixed with the handle, which can prevent the handle 40 from slipping out of the mounting cavity 106 due to vibration, effectively reducing noise. Therefore, a vibration transmission process becomes smoother and high-frequency transmission becomes more effective when the handle 40 is turned on with high frequency vibration. The electric toothbrush head has a more ideal swing amplitude. The wear between the connecting member body 10 and the handle 40 due to long-term vibration friction is reduced. The service life of the electric toothbrush is improved.

Referring to FIG. 3, the connecting member body 10 further includes an annular fastening position 107. The annular fastening position 107 partially surrounds, protrudes and is provided on the outer wall of the bottom of the connecting member body 10. Specifically, in this embodiment, the annular fastening position 107 is provided as a semicircular structure. The annular fastening position 107 and the groove position on the inner wall of the toothbrush rod 302 are snap-fitted into each other, which facilitates further fixation of the electric toothbrush connecting member with the toothbrush head.

Referring to FIGS. 2 and 3, the connecting member body 10 further includes a guide bone position 108. The guide bone position 108 protrudes and is provided on the surface of one side of the mounting groove 101 in a direction of the tail of the connecting member body 10. The two sides of the guide bone position are both opened and provided with a U-shaped hole 109. The U-shaped hole 109 extends in a direction of the mounting cavity 106 and is communicated with the mounting cavity 106.

Specifically, in this embodiment, the guiding bone position 108 and a groove position on the inner wall of the toothbrush rod 302 are snap-fitted together, which is conducive to further fixing the electric toothbrush connecting member with the toothbrush head, thereby preventing the electric toothbrush connecting member from slipping out of the toothbrush rod 302 due to the rotation of the handle 40 by force. The U-shaped hole 109 increases the elastic deformation of the connecting member, which is conducive to the elastic and comfortable insertion of the drive handle into the toothbrush head. Therefore, the assembly process of the drive rod and the toothbrush head does not produce left and right deviation and slip off by force, and cooperate more closely after assembly.

Referring to FIG. 3, the connecting member body 10 has a diameter progressively increasing from top to bottom. Specifically, in this embodiment, this design facilitates adaptation to the construction of the electric toothbrush, which can provide a better grip and hand feeling, as well as increase the stability and balance of the electric toothbrush.

Figure 5:
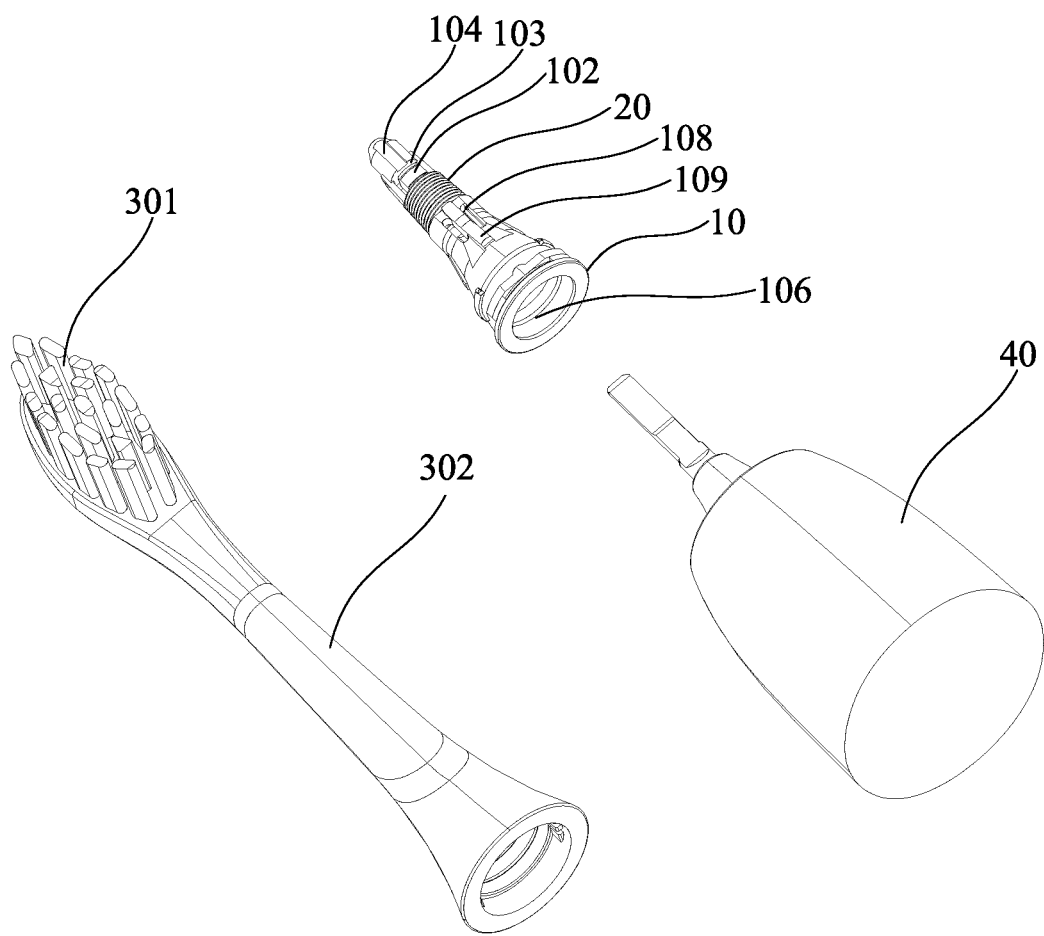
FIG. 5 is an exploded view of an electric toothbrush of the present invention.
Figure 6:
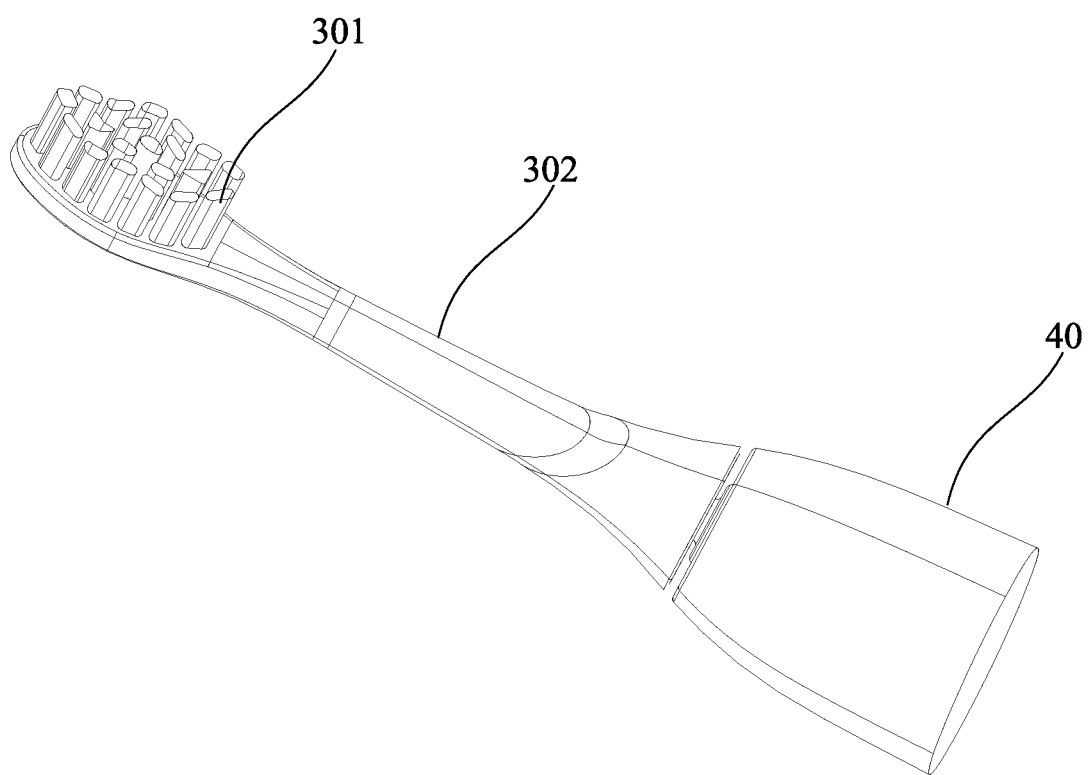
FIG. 6 is a schematic structural diagram of an electric toothbrush of the present invention.

Referring to FIGS. 5 and 6, an embodiment of the present invention further proposes an electric toothbrush, including a toothbrush head and a drive handle. The drive handle includes an electric toothbrush connecting member and a handle 40 as described in the forgoing embodiment. The electric toothbrush connecting member is configured to connect the toothbrush head with the handle 40. The toothbrush head is sleeved on the electric toothbrush connecting member. The top of the handle 40 passes through and is provided inside a mounting cavity 106.

Specifically, in this embodiment, the electric toothbrush can be designed so that the toothbrush head becomes more stable and balanced, which provides a better grip and hand feeling, and facilitates the replacement of the toothbrush head. In addition, the top of the handle 40 penetrates inside the mounting cavity 106, so that the electric toothbrush becomes more compact, lightweight, as well as easy to carry and store. The connection member body 10 of which the outer wall is sleeved with the elastic member 20 is conducive to a better hand feeling and more damping during long-term replacement and insertion. Therefore, the handle 40 and the toothbrush head cooperate more closely together. When the electric toothbrush is used, the handle 40 transmits vibration energy to the toothbrush head 301 via the electric toothbrush connection member, thereby achieving high-frequency swing, achieving the function of cleaning a mouth, and effectively reducing noise. Therefore, transmission becomes smoother. High-frequency transmission effect is more obvious. The swing amplitude of the toothbrush head 301 is more desirable.

Referring to FIGS. 5 and 6, the toothbrush head includes a toothbrush head part 301 and a toothbrush rod 302. The toothbrush head part 301 is provided at the head of the toothbrush rod 302. The inner part of the toothbrush rod 302 is provided with a mounting space with an opening at one side of the mounting space. The electric toothbrush connecting member is provided inside the mounting space. The handle 40 partially rests against the opening of the mounting space when the top of the handle 40 partially penetrates inside the mounting cavity 106.

Specifically, the connecting member body 10 is closely assembled with a housing of the toothbrush head. The handle 40 closely cooperates with the connecting member body 10, which can prevent an internal structural element of the electric toothbrush from making strange noise due to the high-frequency vibration of a drive handle in a working state, thereby achieving smoother vibration transmission and softer noise in the working state. The high-frequency vibration and swing of the toothbrush head 301 is more effective and strong to achieve the best experience effect of cleaning teeth.

The forgoing is only a preferable embodiment of the present invention, and is not intended to limit the patent scope of the present invention. Under the inventive concept of the present invention, an equivalent structure variation made by the contents of the description and drawings of the present invention directly or indirectly applied to other related arts is included in the scope of patent protection of the present invention.

What is claimed is:
1. An electric toothbrush connecting member, comprising a connecting member body, and
an elastic member, wherein
the connecting member body comprises an anti-release fastening position, an outer wall of the connecting member body surrounds a recess and is provided with a mounting groove adapted to the elastic member, the elastic member is sleeved on the mounting groove, and the anti-release fastening position protrudes and is arranged on a surface of one side of the mounting groove;
wherein a disconnecting groove is provided between the anti-release fastening position and a top of the connecting member body, an outer wall of the top of the connecting member body is recessed, opened and provided with a guide groove, and the guide groove extends to the disconnecting groove and is communicated with the disconnecting groove.

2. The electric toothbrush connecting member according to claim 1, wherein the connecting member body further comprises a limit seat, the limit seat is provided at a bottom of the disconnecting groove, the limit seat is partially sleeved on a side of the mounting groove away from the anti-release fastening position, the elastic member is sleeved on the mounting groove, one side of the elastic member rests against both the anti-release fastening position and the limit seat.

3. The electric toothbrush connecting member according to claim 1, wherein an inner part of the connecting member body passes through and is opened and provided with a mounting cavity, and an inner wall of the mounting cavity corresponding to a position of the mounting groove is provided with a tooth-shaped rib position.

4. The electric toothbrush connecting member according to claim 3, wherein the connecting member body further comprises a guide bone position, the guide bone position protrudes and is arranged on a surface of the mounting groove in a direction of a tail of the connecting member body, two sides of the guide bone position are both opened and provided with a U-shaped hole, the U-shaped hole extends in a direction of the mounting cavity and is communicated with the mounting cavity.

5. The electric toothbrush connecting member according to claim 1, wherein the connecting member body further comprises an annular fastening position, the annular fastening position partially surrounds, protrudes and is provided on an outer wall of a bottom of the connecting member body.

6. An electric toothbrush, comprising
a toothbrush head, and
a drive handle, wherein
the drive handle comprises the electric toothbrush connecting member of claim 1 and a handle, the electric toothbrush connecting member is configured to connect the toothbrush head with the handle, the toothbrush head is sleeved on the electric toothbrush connecting member, and a top of the handle passes through and is provided inside the electric toothbrush connecting member.

7. The electric toothbrush according to claim 6, wherein the connecting member body further comprises a limit seat, the limit seat is provided at a bottom of the disconnecting groove, the limit seat is partially sleeved on a side of the mounting groove away from the anti-release fastening position, the elastic member is sleeved on the mounting groove, one side of the elastic member rests against both the anti-release fastening position and the limit seat.

8. The electric toothbrush according to claim 6, wherein an inner part of the connecting member body passes through and is opened and provided with a mounting cavity, an inner wall of the mounting cavity corresponding to the position of the mounting groove is provided with a tooth-shaped rib position, a top of the handle passes through and is provided in the mounting cavity, and the top of the handle is snap-fitted with the tooth-shaped rib position.

9. The electric toothbrush according to claim 8, wherein the connecting member body further comprises a guide bone position, the guide bone position protrudes and is provided on a surface of one side of the mounting groove in a direction of a tail of the connecting member body, two sides of the guide bone position are both opened and provided with a U-shaped hole, and the U-shaped hole extends in a direction of the mounting cavity and is communicated with the mounting cavity.

10. The electric toothbrush according to claim 8, wherein the toothbrush head comprises a toothbrush head part and a toothbrush rod, the toothbrush head part is provided at a head of the toothbrush rod, an inner part of the toothbrush rod is provided with a mounting space with an opening at one side of the mounting space, the electric toothbrush connecting member is provided inside the mounting space, and the handle partially rests against the opening of the mounting space when a top of the handle partially penetrates inside the mounting cavity.

11. The electric toothbrush according to claim 6, wherein the connecting member body further comprises an annular fastening position, and the annular fastening position partially surrounds, protrudes and is provided on an outer wall of a bottom of the connecting member body.

* * * * *